United States Patent [19]

Goel

[11] Patent Number: 4,675,371

[45] Date of Patent: Jun. 23, 1987

[54] THERMOSET POLYMERIC COMPOSITION FROM POLY-OXAZOLINE AND ALKENYL PHOSPHONIC ACID

[75] Inventor: Anil B. Goel, Worthington, Ohio

[73] Assignee: Ashland Oil, Inc., Ashland, Ky.

[21] Appl. No.: 858,781

[22] Filed: May 2, 1986

[51] Int. Cl.⁴ .................. C08F 26/06; C08F 30/02; C08G 83/00

[52] U.S. Cl. .................. 526/260; 526/278; 528/158; 528/159; 528/163; 528/172; 528/168; 528/211; 528/392; 528/398; 528/405; 528/363

[58] Field of Search ............... 526/260, 278; 528/392, 528/398, 405

[56] References Cited

U.S. PATENT DOCUMENTS 4,430,491  2/1984  Culbertson ..................... 528/153

*Primary Examiner*—Harold D. Anderson
*Attorney, Agent, or Firm*—John F. Jones

[57] ABSTRACT

A process for the preparation of a thermoset polymer having good adhesive properties comprising reacting a compound containing a plurality of oxazoline groups with an alkenyl phosphonic acid at a temperature of from about room temperature to about 300° C. is described.

6 Claims, No Drawings

THERMOSET POLYMERIC COMPOSITION FROM POLY-OXAZOLINE AND ALKENYL PHOSPHONIC ACID

This invention relates to a process for the rapid copolymerization of a compound containing a plurality of oxazoline groups with an alkenyl phosphonic acid either alone or in the presence of other reactive materials and to the novel thermoset products which result from said copolymerization.

The synthesis of thermoplastic and thermoset polymers containing poly (ether-amide) groups by reaction of bis-oxazolines with bis- and polyphenolics is described in U.S. Pat. No. 4,430,491.

The copolymerization of bis-oxazolines with alkenyl phosphonic acids either alone or in the presence of reactive materials such as polyphenolics, polycarboxylic acids and polyepoxides has not previously been disclosed in the prior art.

The copolymerization of bis-oxazolines with reactive materials such as polyphenolics, polycarboxylic acids and polyepoxides to give thermoplastic and thermoset polymers in the absence of any catalyst is usually very slow. I have discovered that the copolymerization of bis-oxazolines with alkenyl phosphonic acids is a very rapid reaction and that high temperature resistant thermoset polymers can be prepared at a rapid rate without catalysts when bis-oxazolines are copolymerized with alkenyl phosphonic acids either alone or with other reactive materials such as polyphenolics. The resulting polymers show good adhesion properties toward metal substrates and may also be used in reaction injection molding (RIM), thermoset, and composite applications.

The oxazolines useful in the practice of this invention include a variety of such compounds having at least two 2-oxazoline groups per molecule. The applicable polyfunctional oxazolines are devoid of other functional groups capable of reacting in any manner with either an oxazoline group or an aromatic hydroxyl group. From the standpoint of potential commercial availability the oxazolines derived from the polycarboxylic acids are preferred. Particularly exemplary of such polyacids are the aromatic acids; e.g., isophthalic acid, terephthalic acid and trimesic acid. The polyfunctional oxazoline compounds can be conveniently prepared by the reaction of the corresponding esters of said polyacids and ethanolamines.

Representative polyfunctional oxazoline compounds useful in the practice of this invention include 4,4',5,5'-tetrahydro-2,2'-bisoxazole, a 2,2'-(alkanediyl) bis[4,5-dihydrooxazole], e.g., 2,2'-(1,4-butanediyl) bis [4,5-dihydrooxazole]; a 2,2'-(arylene) bis [4,5-dihydrooxazole], e.g. 2,2'-(1,4-phenylene) bis [4,5-dihydrooxazole], 2,2'-(1,5-naphthalenyl) bis [4,5-dihydrooxazole] and 2,2'-(1,8-anthracenyl) bis [4,5-dihydrooxazole]; a sulfonyl, oxy, thio or alkylene bis 2-(arylene) [4,5-dihydrooxazole], e.g., sulfonyl bis 2-(1,4-phenylene) [4,5-dihydrooxazole], oxy bis 2-(1,4-phenylene) [4,5-dihydrooxazole], thio bis 2-(1,4-phenylene) [4,5-dihydrooxazole] and methylene bis 2-(1,4-phenylene) [4,5-dihydrooxazole]; a 2,2',2''-(arylene) tris [4,5-dihydrooxazole], e.g., 2,2', 2'''-(1,3,5-phenylene) tris [4,5-dihydrooxazole]; a poly [2-(alkenyl)4,5-hydrooxazole], e.g., poly[2-(2-propenyl) 4,5-dihydrooxazole], and the like.

Polyphenolic compounds useful in the present invention include compounds having at least two aromatic hydroxy groups per molecule and particularly the bisphenols, the various benzene and fused aromatic ring diols and triols, e.g., 1,4-benzene diol (hydroquinone), 1,3benzenediol (resorcinol), 1,4-naphthalene diol and 1,3,5-benzene triol; the biphenyl diols, e.g., [1,1'-biphenyl]-2,2'-diol; the alkylene and cycloalkylene bisphenols, e.g., 2,2'-methylene bisphenol, 4,4'-(1-methylethylidene) bisphenol (Besphenol-A), 4,4'-(phenylmethylene) bisphenol, 4,4'-(cyclohexanediyl) bisphenol, 4,4'-(1,2-diethyl-1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonyl bis phenols, e.g., 2,3-oxybisphenol, 4,4'-thiobisphenol and 2,2'-sulfonyl bisphenol; the bis (hydroxyaryl) alkanones, e.g., bis (4-hydroxyphenyl) methanone, 1,5-dihydroxy-9.10-anthracenedione and 4-[bis(4-hydroxyphenyl) methylene]-2,5-cyclohexadiene-1-one; the various benzamide and benzoate derivatives, e.g., 2-hydroxy-N-(4-hydroxyphenyl) benzamide, 4-hydroxy-4-hydroxyphenyl benzoate, 2-methyl-2-[(4-hydroxybenzoyl) oxy methyl]-1,3-propanediyl-4-hydroxybenzoate, bis (4-hydroxy benzoate)-1,2-ethandiyl; 2-(4-hydroxy benzoate) ethyl ether, and bis (4-hydroxy benzamide)-1,4-benzenediyl and the like.

In addition to the phenolic compounds noted above, a variety of oligomers containing a plurality of phenolic residues constitute an important class of materials for the reaction with the oxazolines and alkenyl phosphonic acids in this invention. These phenolic compounds include the base or acid caralyzed phenol-formaldehyde condensation products such as the novalaks, the resoles and phenolic resins characterized in having the benzylic ether linkages prepared by metal ion catalysts such as disclosed in U.S. Pat. No. 3,485,797. Other suitable polyphenol oligomers include the addition polymers and copolymers of a vinyl substituted phenol, e.g., 4-ethenylphenol.

The alkenyl phosphonic acids useful in the present invention include those having the formula I

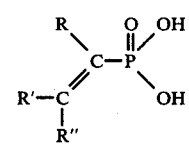

wherein R, R' and R'' independently represent hydrogen, an alkyl group having from 1 to 10 carbon atoms, an aryl group having from 6 to 12 carbon atoms or an alkaryl group having from 7 to 15 carbon atoms.

In the process of this invention the alkenyl phosphonic acid serves as a multifunctional molecule. The hydroxyl groups of the phosphonic acid are believed to react with the oxazoline rings to give ring opening products containing phosphonate and amide groups. The alkenyl groups may be either homopolymerized or copolymerized with other unsaturated molecules by using a free radical or cationic catalyst. The copolymerizable monomers with the alkenyl gorup may include unsaturated hydrocarbons (e.g. styrene, acrylic acid and methacrylic acid and derivatives, vinyl esters such as vinyl acetate, acrylonitrile, methacrylonitrile, acrylamide, methacrylamide and the like). In such reactions, the alkenyl phosphonic acid may also behave as an oxazoline ring opening homopolymerization catalyst, thus the copolymerization of bis-2-oxazoline with alkenyl phosphonic acid may also be carried out in the presence of other reactive materials such as polyphenolics, polycarboxylic acids, polyepoxides, polylthiols, polyamides and imides, mixtures thereof and the like. In these polymerization reactions, the amounts of bis-oxazoline to alkenyl phosphonic acid can be in the range of 99/1 to 50/50 by weight. The process of this invention may be carried out at a temperature in the range of from about room temperature to about 300° C.

In the copolymerization reactions involving bis-oxazoline/reactive material such as polyphenolics/alkenyl phosphonic acid, the ratio of bis-oxazoline to reactive material may be in the amounts (based on equivalents) in the range of 1:1 to 10:1 and the alkenyl phosphonic acid may be used in from 1 to 30% by weight based on the weight of the total reactants. The polymers obtained in the reactions of bis-oxazoline with reactive material such as polyphenolics and alkenyl phosphonic acid show high glass transition temperatures and thermal stabilities. The polymers of this invention show good flame retardant properties and they also have good adhesion toward metals such as steel and aluminum.

This invention is further illustrated in the following representative examples.

EXAMPLE 1

Isophthaloyl bis-oxazoline (4.5 g) and isopropenyl phosphonic acid (2 g) were mixed and heated at 165 degrees C. A clear solution formed within 20 seconds which gelled within one minute to give a thermoset polymer. This polymer was postcured at about 170 degrees C. for one hour. The polymer was found to be insoluble in solvents such as acetone, tetrahydrofuran (THF) and dimethylformamide (DMF). The $T_g$ (glass transition temperature) of the polymer as determined by DSC (differential scanning calorimetry) was found to be 154 degrees C. and 10% weight loss by thermal gravimetry analysis (TGA) was found to occur at 318 degrees C.

EXAMPLE 2

Isophthaloyl bis-oxazoline (4.3 g) and resorcinol (1.6 g) were mixed and 0.5 g of isopropenyl phosphonic acid was added and the mixture was heated at 165 degrees C. A clear solution formed within 20 seconds which gelled within one minute to give a solid polymer. This polymer was postcured at 170 degrees C. for one hour. The product was found to be insoluble in common organic solvents such as acetone, THF, and DMF. The $T_g$ by DSC was found to be 165.2 degrees C. and the 10% weight loss by TGA occurred at 328 degrees C.

EXAMPLE 3

This is a comparative example to demonstrate the formation of a thermoplastic polymer at a slow rate in the reaction of a bis-oxazoline with resorcinol and is outside the scope of this invention. Isophthaloyl bisoxazoline (10.0 g) and resorcinol (3.5 g) were mixed and heated at 165 to 158 degrees C. No gelation occurred within five minutes and only a thermoplastic material formed on heating for about 1 hour. The heating was continued for 3½ hours to give a polymeric material which was found to be soluble in solvents such as DMF and showed a melting point of 75 degrees C. indicating it to be thermoplastic.

EXAMPLE 4

A mixture of 4.52 g of isophthaloyl bis-oxazoline, also called 2,2'-(1,3-phenylene) bis [4,5-dihydrooxazole]3.5 g of a polyphenolic compound (Alnovol 320 from American Hoescht, a novalak type resin resulting from the phenol formaldehyde reaction), and 0.6 g of isopropenyl phosphonic acid was heated at 170 degrees C. with stirring. A clear solution formed within 25 seconds which gelled within one minute to give a thermoset polymer. The polymer, after postcuring at 170 degrees C. for one hour, was found to have a $T_g$ (DSC) of 198 degrees C. and a 10% weight loss by TGA at 335 degrees C.

EXAMPLE 5

A mixture of 4.3 g of isophthaloyl bis-oxazoline, 4.2 g of Alnovol, 2 g of liquid diglycidyl ether of Bisphenol-A and 0.4 g of isopropenyl phosphonic acid was heated at 165 degrees C. A clear solution occurred within 20 seconds of heating and the solution gelled in approximately two minutes to give a pale yellow solid polymer. The polymer was found to have a $T_g$ (DSC) of 177 degrees C. and a 10% weight loss by TGA occurred at 334 degrees C.

EXAMPLE 6

A mixture of 5.1 g of isophthaloyl bis-oxazoline, 2.5 g of adipic acid and 0.5 g of isopropenyl phosphonic acid containing 1% t-butyl perbenzoate, was heated at 170 degrees C. Gelation occurred within 1.5 minutes to give a thermoset polymer. The polymer was postcured at 200 degrees C. for one hour. The product was found to have a $T_g$ (DSC) of 78 degrees C. and a 10% weight loss by TGA occurred at 313 degrees C.

EXAMPLE 7

This comparative example which is outside the scope of this invention demonstrates that a thermoplastic polymer is formed when a bis-oxazoline and adipic acid are copolymerized. A mixture of 5 g of isophthaloyl bis-oxazoline and 2.6 g of adipic acid were heated at 170 degrees C. and no gelation occurred within five minutes. The mixture gradually became viscous upon continued heating for two hours and the solid polymer was found to be soluble in DMF at room temperature.

EXAMPLE 8

A mixture of phthaloyl bis-oxazoline, 2.8 g of Alnovol and 0.5 g of isopropenyl phosphonic acid containing 1% of 5-butyl perbenzoate was heated at 170 degrees C. The mixture gelled within two minutes and the polymer was postcured at 200 degrees C. for one hour. The polymer was found to have a $T_g$ (DSC) of 191 degrees C. and the thermal decomposition (10% weight loss by TGA) was at 345 degrees C.

EXAMPLE 9

A mixture of 5.3 g of phthaloyl bis-oxazoline, 2.5 g of adipic acid and 0.6 g of isopropenyl phosphonic acid containing 1% 5-butyl perbenzoate was heated at 160 degrees C. for 30 seconds to give a clear solution. This liquid was applied between (1) two 1"×4" aluminum panels and (2) two cold rolled steel panels covering one square inch overlap area and the bonds were cured at 170 degrees C. for 15 minutes. The lap shear strength on an Instron instrument showed strengths of 1550 psi (aluminum) and 1230 psi (steel).

EXAMPLE 10

A mixture of 4.0 g of phthaloyl bis-oxazoline, 2.8 g of Alnovol and 10.6 g of isopropenyl phosphonic acid containing 1% of t-butyl perbenzoate was heated at 165 degrees C. for 30 seconds to give a clear liquid. This liquid was applied between two 1"×4" panels of (1) cold rolled steel and (2) aluminum, covering one square inch overlap area in each case. The bonds were cured by heating at 170 degrees C. for 15 minutes and the resulting structures showed lap shear strengths of 950 psi (steel) and 1470 psi (aluminum).

EXAMPLE 11

A mixture of 4.5 g of phthaloyl bis-oxazoline, 4.0 g of Alvonol, 2.4 g of diglycidyl ether of Bisphenol-A and 0.6 g of isopropenyl phosphonic acid was prepared. This mixture was heated at 165 degrees C. for 30 seconds to give a clear liquid and the liquid was applied between two 1"×4" panels of (1) aluminum and (2) cold rolled steel, covering one square inch overlap area. The bonds were cured at 165 degrees C. for 15 minutes and tested at room temperature for lap shear strength. The lap shear strength for aluminum was 1430 psi and for cold rolled steel was 1380 psi.

I claim:

1. A process for preparing a thermoset polymer comprising reacting a compound containing a plurality of oxazoline groups with an alkenyl phosphonic acid at a temperature in the range of from about room temperature to about 300° C.

2. The process of claim 1 wherein the compound containing a plurality of oxazoline groups is one containing at least two 2-oxazole groups per molecule.

3. The process of claim 2 wherein the alkenyl phosphonic acid is one having the formula

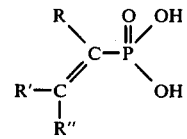

wherein R, R', and R" independently represent hydrogen, an alkyl group having from 1 to 10 carbon atoms, an aryl group having from 6 to 12 carbon atoms or an alkaryl group having from 7 to 15 carbon atoms.

4. The process of claim 3 wherein the amounts of compound containing a plurality of oxazoline groups to alkenyl phosphonic acid is in the range of from 99/1 to 50/50 by weight.

5. The process of claim 4 wherein the compound containing a plurality of oxazoline groups is isophthaloyl bis-oxazoline.

6. The thermoset polymer prepared by the process of claim 1.

* * * * *